May 22, 1934.  E. J. GRANT  1,959,667
CONTROL DEVICE
Filed Aug. 8, 1932   3 Sheets-Sheet 1
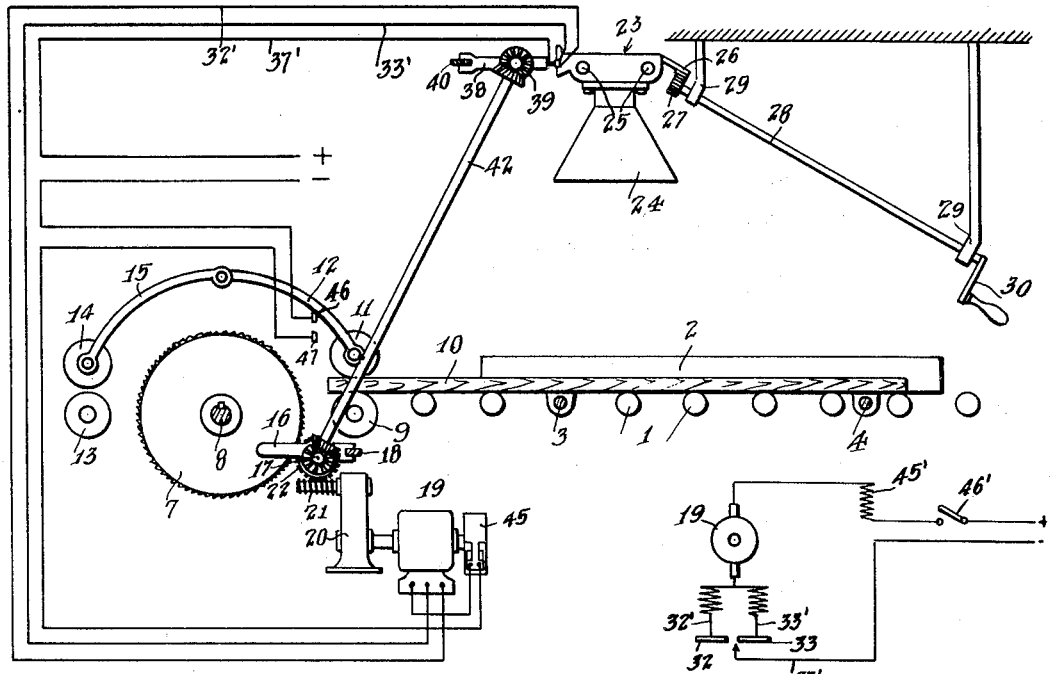
Fig. 1
Fig. 3
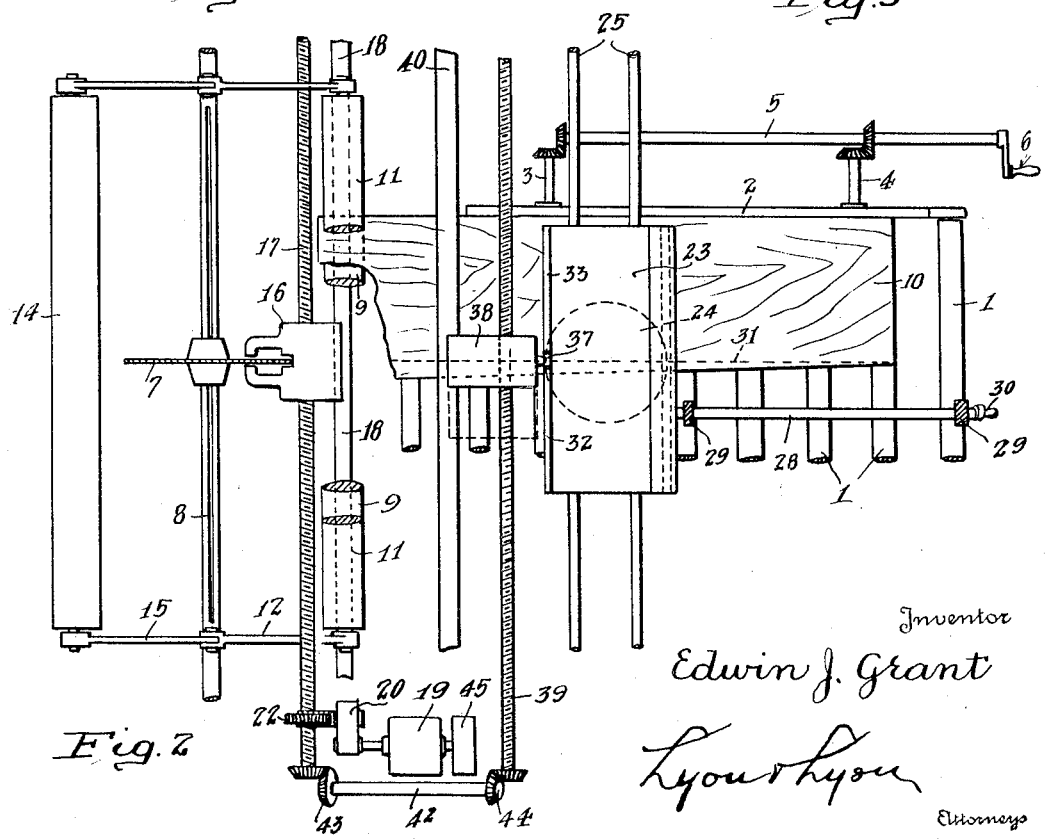
Fig. 2
Inventor
Edwin J. Grant
Lyon & Lyon
Attorneys May 22, 1934.  E. J. GRANT  1,959,667
CONTROL DEVICE
Filed Aug. 8, 1932  3 Sheets-Sheet 2

Inventor
Edwin J. Grant
By Lyon Lyon
Attorneys

May 22, 1934.  E. J. GRANT  1,959,667
CONTROL DEVICE
Filed Aug. 8, 1932  3 Sheets-Sheet 3
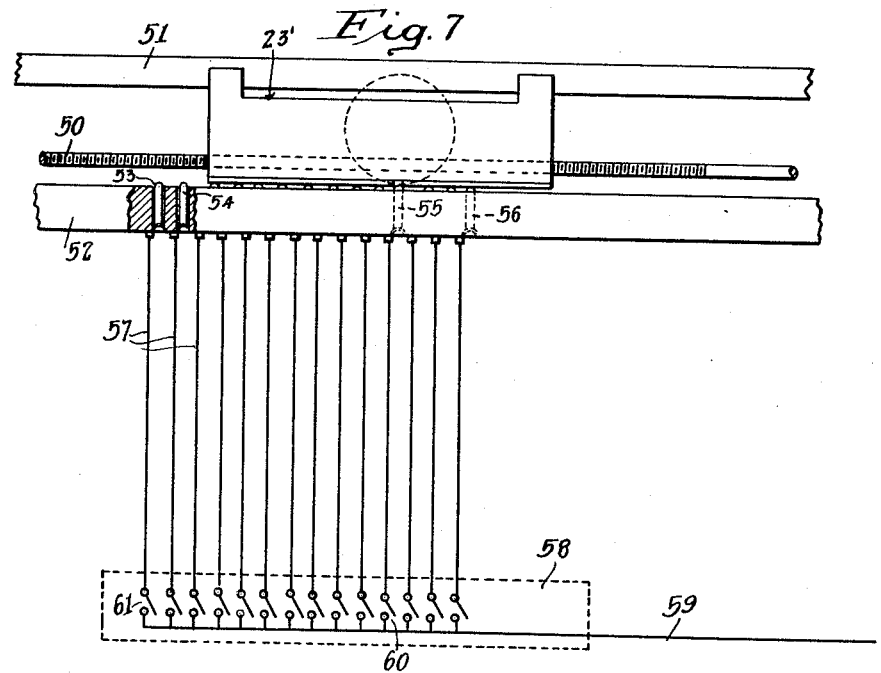
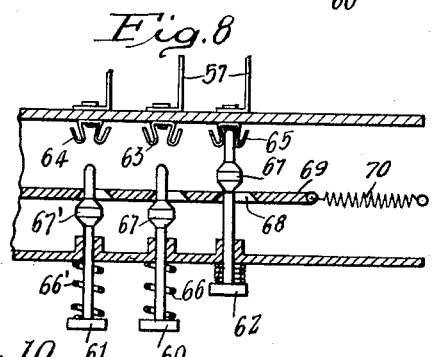
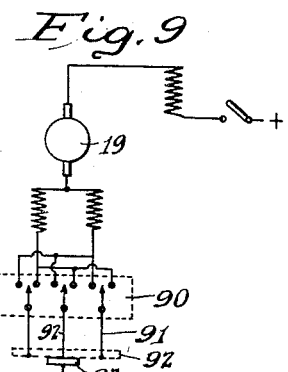
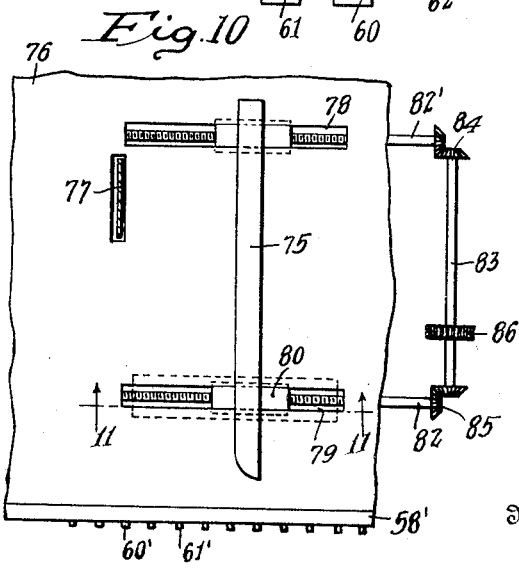
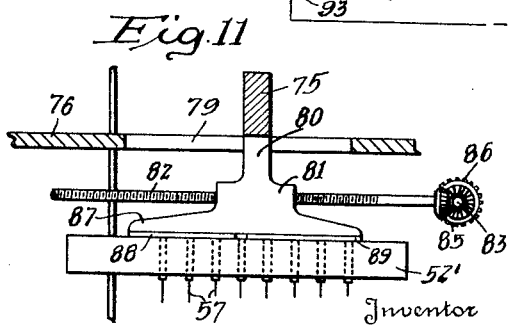
Inventor
Edwin J. Grant
By Lyon & Lyon
Attorneys Patented May 22, 1934

1,959,667

UNITED STATES PATENT OFFICE 1,959,667

CONTROL DEVICE

Edwin J. Grant, Los Angeles, Calif.

Application August 8, 1932, Serial No. 627,915

6 Claims. (Cl. 143—37)

This invention relates to a device for controlling the movement of and adjustably positioning an element such as a guide, a support, a saw, cutting means or other element which in use cooperates with other substantially stationary elements.

More particularly, the invention relates to a control device whereby a movable element capable of assuming a plurality of different positions may be caused quickly and automatically to assume any one of said positions, the control device including a control panel provided with push buttons, switches or similar elements, each of which is correlated to or represents a particular position of the element which is being controlled. By depressing or actuating one of the push buttons of the control device, the movable element being controlled may be selectively caused to move and stop at a selected position.

Although this invention is applicable to a great number of uses in various industries, the invention will be particularly described hereinafter in its adaptation to the lumber industry and to lumber processing machines such as edgers, band saws and the like.

The apparatus of this invention, when adapted to lumber processing machines, may be caused to automatically adjust and position supports or guides with respect to cutting planes of saws, adjustably position saws with respect to guides, or move and adjustably position saws as well as other devices, such as light-projecting means. Such automatic and selective control facilitates operations very materially as will be apparent from the description given hereinafter.

For example, in the preparation of lumber and similar materials, it is the practice to cut logs into boards having varying widths, depending upon the diameter of the log from which the board is cut. Such boards are then rip-sawed to trim the edges thereof, or to produce a number of strips of lumber of a predetermined width. Such rip-sawing is usually performed on what is known as an edging machine, such machine comprising a saw table over which the lumber passes longitudinally into contact with a moving saw.

It is desirable that the boards produced from a slab shall be free from knots or the edges of the boards so produced at least should be free from knots. It is also desirable that the slab be trimmed so as to produce a board of maximum width. Thus it is desirable that the operator of such edging machine should know the line which will be formed by the saw cut upon the board so that he may adjust the board and saw to permit the cut to be along a line free from knots or other imperfections.

Heretofore, the saws mounted on edging machines were manually moved along the shaft by means of levers controlled by the operator and the position of the cutting plane of the saw was merely guessed by the operator. The operator therefore did not know precisely where the saw would go through the slab moving towards the saw on the feed table.

A preferred form of device embodying the present invention, however, permits the operator to adjustably position the saw automatically and not manually and furthermore, the operator may visually and definitely observe the line of cut which such saw will follow even before the saw has moved into the preferred or selected cutting plane. By being able to thus visually observe the line of cut which the saw will make, the operator can automatically adjust the saw to another or different position when he observes that such line of cut is not in the exact location to give the greatest value from the cut to be made.

Such preferred embodiment of the present invention may employ a light-projecting device, that is, a device capable of projecting a narrow, intense beam of light upon the material or slab to be cut or operated upon. One form of light-projecting device which would project a line of light or a line of shadow is disclosed in my copending application Serial No. 351,692, now Patent No. 1,916,567, entitled "Apparatus for producing light boundaries".

The control device of this invention is particularly adapted to electrically driven means. The control device embodies a circuit connection with the motor which includes a contact member or members movable with the element whose position it is desired to control. Such movable contact member cooperates with opposed stationary or movable contacts in the same circuit and by these means, hereinafter described in greater detail, the adjustable positionable element may be caused to move forwardly or rearwardly and to stop at any predetermined and selected point.

It is an object of this invention to disclose and provide means for controlling and automatically selectively positioning driven elements.

Another object of this invention is to disclose and provide a device whereby an electrically driven movable element capable of assuming a plurality of different positions may be selectively and adjustably caused to move to a predetermined position and stop.

Another object of this invention is to disclose and provide means for adjustably and selectively causing guide members or supports for material to be cut or operated upon to move into predetermined and selected positions with respect to saws, cutting means, etc.

A further object of this invention is to disclose and provide a control system whereby a saw of an edging machine can be accurately and automatically moved to any selected position relative to the saw table.

A further object of the present invention is to disclose and provide a sawing machine which includes a device for projecting a line of light upon the material to be cut, including a power actuated device, whereby the saw may be automatically shifted into alignment with any position of the light-projecting means.

A still further object of the invention is to provide a power actuated device for shifting the saw and the line of light projected by a movable carriage positioned above the edger table so as to relieve the operator of the necessity of manually adjusting the light or light-projector carriage.

These and other objects, uses and advantages of the invention will be apparent from the following detailed description of certain embodiments of the invention.

In describing such embodiments of the invention, reference will be had to the appended drawings, in which Fig. 1 is a diagrammatic side elevation of a lumber edger equipped with one form of control device.

Fig. 2 is a diagrammatic plan view of the edger shown in Fig. 1.

Fig. 3 is a simplified diagram of a wiring system which may be employed in the device shown in Figs. 1 and 2.

Fig. 7 is a plan view, partially diagrammatic, of a device employing the circuit shown in Fig. 6.

Fig. 8 is an enlarged sectional view of a portion of a control panel capable of being utilized in a device of the type shown in Figs. 6 and 7.

Fig. 9 is a wiring diagram showing a still further modification of the circuit capable of controlling the operation of an element in accordance with this invention.

Fig. 10 is a plan view of a portion of a band saw table provided with a movable guide.

Fig. 11 is a vertical section taken substantially along the plane 11—11 of Fig. 10, illustrating the control means whereby the guide may be automatically and adjustably positioned.

Figure 4:
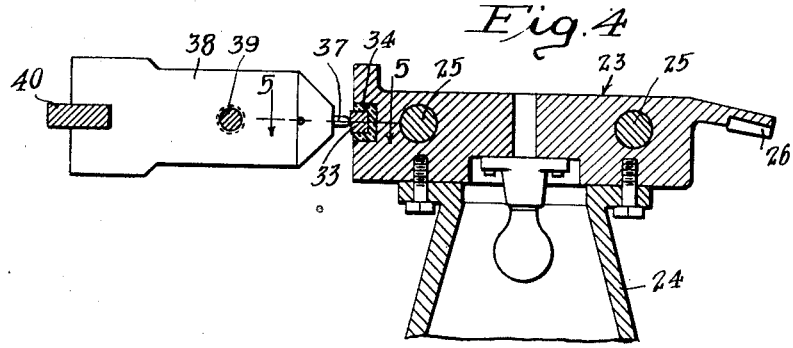
Fig. 4 is an enlarged vertical section through a portion of the light-projecting carriage of the device shown in Figs. 1 and 2.

Figs. 1 to 3 illustrate the adaptation of the invention to a conventional edging machine which usually embodies a feed table provided with rolls 1 and with a longitudinal guide 2 which may be adjustably positioned. As shown in Figs. 1 and 2, the guide 2 is mounted on screw shafts 3 and 4 held in suitable bearings, said shafts 3 and 4 being driven by means of a shaft 5 through miter gear connections. The shaft 5 may be operated manually as by means of the crank 6.

The edger may be provided with one or more circular saws 7 keyed to a driven shaft 8, said saws 7 being longitudinally movable on the driven shaft 8. Means for driving the shaft are not shown. The edger is also preferably provided with a driven feed roll 9 adapted to feed the slabs of lumber 10 into cutting contact with the saw 7. The power driven feed roll 9 may have an opposing weighted or traction roller 11 pivoted on arms 12, said traction roller 11 holding the lumber 10 in driving contact with the driven feed roll 9. An outgoing driven roll 13 may be positioned on the discharge side of the saw 7, said driven roll 13 being also provided with a weighted roll 14 pivoted on an arm 15. The lumber, therefore, is positively driven into contact with and positively withdrawn from contact with the saw 7.

Figs. 1 and 2 show means for adjustably moving the saw 7 on the shaft 8, such means including a carriage 16 threadedly mounted upon a screw shaft 17 so as to be longitudinally movable thereon. The carriage 16 may cooperate with a guide 18. The carriage 16 is provided with fingers having preferably hard wood tips adapted to contact the sides of the saw blade. The shifting of the carriage 16 by rotation of the threaded shaft 17 causes the saw 7 to be moved along the shaft 8.

The threaded shaft 17 which actuates the saw-moving carriage may be driven electrically as by means of a motor 19 through a reduction gearing 20, a worm 21, and a spiral gear 22 mounted on the screw shaft 17.

Suspended above the feed table of the edger is a carriage 23 supporting a light-projecting means 24. This light-projecting means 24 may be constructed in accordance with the aforesaid copending application Serial No. 351,692 or in any other manner, provided it is capable of projecting or casting a well defined line of light or of shadow upon the slabs or boards 10 while they are on the feed table. As shown, the carriage 23 is slidably mounted upon guides 25 extending transversely above the feed table. The rear edge of the carriage 24 is provided with a downwardly directed rack gear 26 with which a spur gear 27 mounted upon a shaft 28 supported in suitable bearings 29, is in mesh. The shaft 28 may be operated by means of a crank 30 by the operator positioned at the feed end of the table. By rotating the crank 30, therefore, the operator can cause the carriage 23 together with its light line, to travel along the transverse guides 25.

In the form of device shown in Figs. 1 and 2, the operator can manually move the carriage 23 and light line projector 24 by operating the crank 30 until the line of light cast by the projector is in desired position on the board, such as the board 10 which the operator wants to cut. As shown in Fig. 2, for example, the slab 10 is not rectangular, the forward end being wider than the rear end. The operator desires to trim this board so as to produce a rectangular board of maximum width. He adjusts the carriage 23 by operating the crank 30 until the line of light (or of shadow) cast by the projector 24 and indicated at 31, assumes the position shown in Fig. 2. This, then, is the desired or preferred cutting plane through which the cut should be made. The saw 7, however, may have been at some other position and not in alignment with the beam of light 31 to which the operator has just moved it. The apparatus of this invention causes the carriage 16 to automatically move the saw 7 into alignment with the beam 31 and then stop so that, when the board or slab 10 is advanced by the power roll 9 into the saw 7, the slab 10 is actually cut along the line indicated by the projected beam 31.

Figure 5:
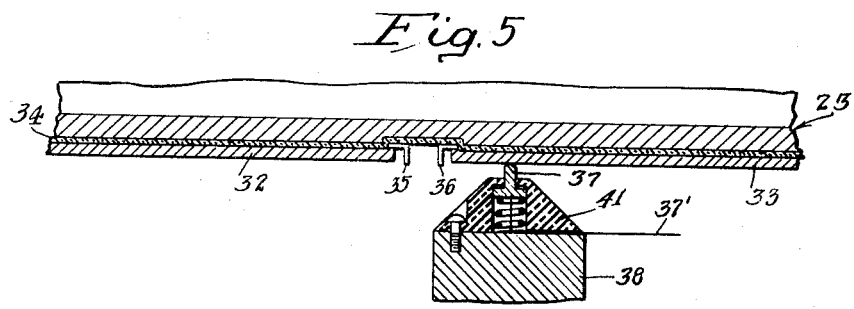
Fig. 5 is an enlarged horizontal section taken along the plane 5—5 of Fig. 4.

This automatic movement of the saw 7 is accomplished by the following means:

The carriage 23 (more specifically shown in Figs. 4 and 5) is provided with two longitudinal bus bars or copper strips 32 and 33. These bus bars or conductors 32 and 33 are suitably electrically insulated from the carriage 23 as indicated at 34. The ends of the contact bars 32 and 33 are spaced from each other as indicated in Fig. 5 so as to form a gap. The ends of the contact bars 32 and 33 are provided with small springs 35 and 36 electrically connected respectively to the contact members 32 and 33, these springs 35 and 36 extending slightly beyond the face formed by the two contact bars 32 and 33. The two contact members 32 and 33 are electrically connected as by lines 32' and 33' with the electric motor 19 which is of the reversing type. For example, for purposes of simplicity it may be assumed that the motor 19 is provided with two field windings, the passage of current through one causing the motor to turn to the right whereas the passage of current through the other winding causes it to go to the left.

Opposing the carriage 23 is a movable contact or brush 37 carried by a block 38 threadedly mounted upon a screw shaft 39 extending transversely above the edger feed table. The block 38 may be additionally guided for longitudinal movement on the screw shaft 39 by means of a guide rod 40 with which said block 38 cooperates. The block 38 is shown in more detail in Fig. 5 wherein it is seen that the block is provided with a tip 41, preferably made of non-conducting material, the electrical brush or contact 37 being yieldably held therein. This brush or contact point 37 is connected as by means of line 37' with a source of electrical energy. When the contact 37 is therefore in contact with one of the conductors 32 or 33, an electrical connection is established between the source of electrical energy and the motor 19 and particularly one of the field windings of said motor.

The screw shafts 39 and 17 are simultaneously driven by the motor 19, a mechanical connection being used between these two screw shafts by means of a connecting shaft 42 and miter gears 43 and 44. If, therefore, block 38 had been in position indicated by dotted lines in Fig. 2 and the operator then moved the carriage 23 to the position shown in full lines, electrical contact would have been made between contact point 37 and conductor 32. The conductor 32 is connected by line 32' to that winding of the motor 19 which causes the shafts 39 and 17 to rotate and move the block 38 and carriage 16 to the right. The motor 19 would therefore immediately start to drive the shafts 17 and 39 and to move the block 38 towards the center of the carriage 23. As long as electrical contact is established between the brush 37 and contact bar 32, such motor drive will persist. When, however, the contact point 37 enters the gap between the conductors 32 and 33 carried by the carriage 23, the circuit is broken and the motor will stop driving the shafts 39 and 17. The separation or gap between the two contacting bars 32 and 33 is preferably directly above and in alignment with the beam of light 31 cast by the projector 24 and for this reason, when the circuit is broken by reason of contact 37 entering the gap between conductors 32 and 33, the saw 7 is stopped by the yoke 16 in direct alignment with said beam 31, whereupon forward motion of the slab 10 into the saw 7 will insure the cutting of said slab along the line indicated by said projected beam 31.

The springs 35 and 36 positioned at the ends of the conductors 32 and 33 are for the purpose of eliminating undue sparking when the moving contact 37 enters the gap between the conductors 32 and 33. The spring 36, for example, is electrically connected to the conductor 33 and as the brush 37 moves toward the gap, the end of spring 36 which extends somewhat beyond the plane of the conductor 33, is bent towards the other contact 32 and then quickly snaps back into its original position, thus breaking the circuit without undue arcing.

In the arrangement of elements described hereinabove, it is therefore to be noticed that an indicating line or shadow projected by the projector 24 is moved manually so as to indicate the precise line along which it is desired to cut or saw the board. By so moving the carriage 23, the electrical contacts are established between element 32 or 33 with the brush 37 so as to supply electrical energy to the motor 19 or to that field winding of the motor which causes the shafts 39 and 17 to rotate in the direction necessary to place the saw 7 in alignment with the line or shadow projected by the lamp 24. When the saw reaches a plane coincidental with a vertical plane passing through the projected line 31, the circuit is automatically broken and the saw stops in its longitudinal motion.

In order to insure a precise and rapid stop to the transverse motions of the block 38 and of the carriage 16 which moves the saw, a magnetic brake 45 is provided, this magnetic brake being applied whenever the circuit is broken. Furthermore, in order to obviate accidents caused by accidental motion of the saw along the driving shaft 8 when a board or slab of lumber is actually being cut by said saw, the arm 12 of the traction roller 11 is provided with a contact 46, said contact being capable of cooperating with and closing a circuit with a stationary contact 47 when no lumber is present between the traction roller 11 and the driven feed roll 9. If, however, a slab of lumber has entered between the feed roll and the traction roller (thus raising the traction roll on its arm 12), the circuit is broken between contacts 46 and 47. Whenever such line is broken, the magnetic brake 45 is actuated and clamped upon the motor so as to prevent further rotation thereof. The magnetic brake 45 need not be described in detail as this is an element well known in the art. The coil which normally maintains the brake in the off position, is indicated at 45' in Fig. 3. The safety switch consisting of contacts 46 and 47 is indicated in Fig. 3 as 46'.

Furthermore, it is to be understood that although in the description given hereinabove reference has been made to an electric motor provided with two field windings, this particular type of motor need not be employed. Instead it is to be understood that electric current may be supplied to the armature of the motor independently of the field winding and the flow of current through either the field or the armature may be reversed so as to cause the motor drive to operate in either direction selectively. Such a motor may be controlled in any suitable manner as, for example, by the use of reversing switches such as magnetically operated conductors or relays. The use of relay control for reversing motors is well known and need not be described in detail here.

Figure 6:
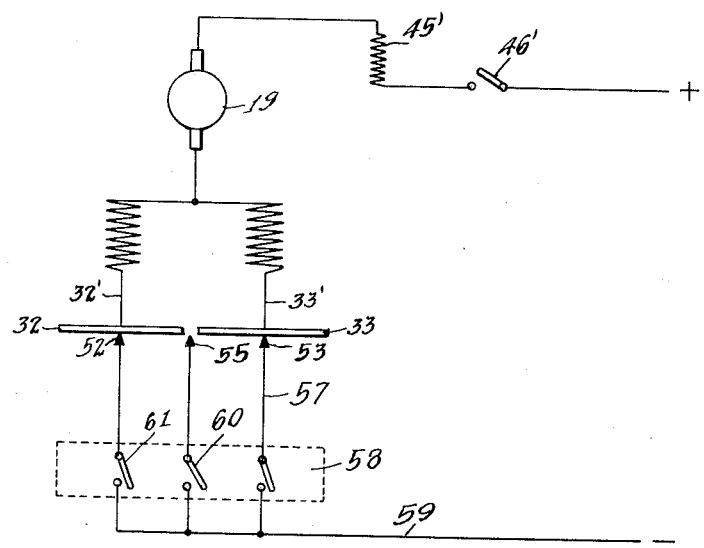
Fig. 6 is a wiring diagram illustrating a modified circuit or system coming within this invention.

A modified form of device or control circuit is illustrated in Figs. 6, 7 and 8. Referring to Fig. 6, the current may be supplied through a safety switch 46' to a magnetic brake coil 45' and to the motor 19, in the same manner as described hereinabove. The reversing field windings may be connected by leads 32' and 33' to conductor bars 32 and 33 spaced from each other as described heretofore. These conductor bars 32 and 33 are carried by the light carriage 23' shown in Fig. 7. As shown in Fig. 7, however, the light carriage 23' is threadedly mounted upon the screw shaft 50 and a stabilizing guide 51 provided for cooperation with the carriage 23'. In other words, the carriage 23' is now mounted so as to be automatically moved by the threaded shaft 50, this threaded shaft 50 taking the place of the screw shaft 39 of Fig. 2. The screw shaft 50 is operably connected to a driving means and screw shaft 17.

Positioned above the edger table and in cooperative relation with the projector carriage 23' is a contact bar 52 provided with a plurality of spaced contact points 53, 54, 55, 56, etc. These contact points 53 to 56 are capable of contacting with the conductor elements 32 and 33 carried by the carriage 23'. Furthermore, all of said contact points 53 to 56 are connected by suitable lines, such as 57, to a control panel indicated at 58 and positioned near the feed end of the edger machine within easy reach of the operator of said machine. The control panel is preferably provided with a plurality of switches by means of which any of the contact points 53 to 56 may be energized from the line 59.

It will be evident, therefore, that if switch element or button 60 is depressed so as to close the circuit, nothing will happen as switch 60 merely energizes contact 55 and said contact 55 is now in the gap between conductors 32 and 33 so that the circuit is still open. If, however, switch element or button 61 is depressed, contact 53 is energized and as said contact element is in contact with the conductor 32, the left field winding of the motor 19 will be energized and for this reason the shaft 50 will be driven so as to move the carriage 23' towards the right until contact element 53 slips off the conductor 32 into the insulated or non-conducting gap between said conductor 32 and the conductor 33. Obviously, therefore, means have been provided whereby the carriage 23' may be caused to assume a plurality of different positions and whereby such carriage may be caused to move and stop at any predetermined and desired point or position.

From an examination of Fig. 6, however, it will be evident that only one of the buttons or switches in the control panel 58 can be closed at one time. Fig. 8 illustrates a form of control panel found satisfactory. Said control panel may comprise a plurality of spaced buttons, such as the buttons 60, 61 and 62, such buttons being normally maintained out of contact with yielding terminals 63, 64 and 65 by means of springs 66. Buttons 60 and 61 are shown disengaged whereas button 62 is shown depressed so as to close the circuit. The various yielding terminals 63 to 65 are connected by suitable lines 57 to predetermined contact points, such as the contact points 53, 55 and 56 in the contact member 52.

It is to be noticed that buttons 60 to 62 are mounted on push rods provided with a protuberance 67. This protuberance or enlargement on the push rods acts as a latching element capable of retaining the button in depressed position and in contact with the terminal 65. The enlargement 67 is capable of passing through an aperture 68 formed in a latching bar 69 yieldably urged to one side as by means of a spring 70. When the button is depressed, the enlargement 67 is forced through the opening 68, the entire latch bar 69 moving yieldably so as to place the aperture 68 in alignment with the enlargement 67. As soon as said enlargement 67 has passed through the aperture 68, the latching bar 69 snaps to its original position as shown in Fig. 8, by reason of the spring 70. The button 62 is maintained in depressed position and the circuit thus closed until another button is depressed.

If, for example, button 61 were to be depressed, the enlargement 67' on the rod of this button would cause the latch bar 69 to move, said movement permitting the spring 66' to snap the enlargement 67 through the aperture 68 into original position. This or any other button or switching arrangement capable of performing substantially the same result may be employed in the control panel 58.

The form of apparatus illustrated in Figs. 6, 7 and 8, therefore, permits any carriage to be moved to a predetermined point by selective remote control. Although Fig. 7, as described hereinabove, represents in effect a modification of the edger shown in Figs. 1 and 2, it is obvious that instead of controlling a carriage provided with a projecting lamp, a similar system of control can be utilized on various other devices.

As shown in Figs. 10 and 11, the control device may be adapted to the selective operation of a guide 75 extending above a table 76 through which a band saw 77 operates. The table 76 may be provided with two slots 78 and 79 through which arms 80 extend, said arms being connected to a nut 81 threadedly mounted on a screw shaft 82 positioned below the table 76 in suitable bearings, not shown. Rotation of the shafts 82 and 82' by means of a connecting shaft 83 and miter gears 84 and 85 will obviously cause the guide 75 to move toward or away from the cutting plane of the band saw 77. The shaft 83 may be driven by means of a spiral gear 86 driven by means of a worm and electrical motor, not shown.

The nut 81 is also provided with a shoe 87 having contacting sections 88 and 89 therein with a gap or non-conducting section therebetween. The conductors 88 and 89 are connected to current supply means leading to the field windings of a motor used in driving the shaft 83.

The shoe 87 is in operative relation to a stationary conductor bar 52', this conductor bar having a plurality of electrical contact points therein, as shown in a similar conductor bar illustrated in Fig. 7. These various contact points are connected by separate leads 57 with a control panel 58' whereby any one of the contact points in conductor bar 52' may be energized with electrical energy. The electrical circuit is substantially identical to that shown in Fig. 6 and in this manner it is possible to quickly, accurately and automatically cause the guide 75 to assume different positions with respect to the cutting plane of the band saw 77. The various buttons 60', 61', etc., carried by the control panel 58', may be numbered in inches or half inches from the cutting plane of the band saw 77 so that the operator by depressing the proper button, may cause the guide 75 to assume a position with respect to the cutting plane of the band saw so as to permit the production of lumber of the desired width.

Fig. 9 diagrammatically illustrates a modified type of control circuit. As there shown, the motor 19 is provided with right and left field coils, said field coils being electrically connected to a control panel 90. Said control panel 90 may be provided with a plurality of buttons or switches each representing a predetermined position of the element under control. Each of said buttons may then be connected as by a lead 91 with a contact point in a stationary contact member 92. A single large brush 93 carried by the moving element, cooperates with the contact points in the contact bar 92. The contact brush 93 is connected to a source of electrical energy and is of such size that it can bridge any two adjacent contact points in the segmental contact bar 92. By operating the control panel 90 in such manner as to connect lines 91 and 92 with the right field winding of the motor 19, the motor 19 will rotate to the right, driving the large movable brush 93 to the right. Such brush will move to the right until it gets just beyond the contact represented by line 91 and then stop. In such position, it will still make electrical connection with a contact point but as the circuit has not been closed through such contact point with either the right or left field winding, the motor circuit goes dead and the movable brush, together with whatever element is carried thereby, stops. The precise type of switch or switches used in the control panel 90 of a device operating in accordance with the method there described need not be set forth in detail here as those skilled in the electrical arts will readily apply well known elements required for this purpose.

It will be apparent from the description given hereinabove that a control system has been disclosed which will automatically, definitely and accurately cause a movable element to move and assume a predetermined position. The adaptation of the control device to some wood working machinery has been disclosed but it will be evident that the control devices of this invention may be applied to numerous other machines, both in the lumber industry and in other industries. When the control device of this invention is applied to an edger, it is not necessary that the operator guess or estimate the approximate position or line of cut of the saw but instead when means for projecting a line of light or shadow is used, the operator can visually observe where the cut will be made before such cut is actually made, thereby permitting the operator to change or vary the position of the saw and thereby cut the lumber to best advantage. Even if the light-projecting means is not employed and the control device merely applied to movement of a saw with respect to a stationary guide or the movement of a guide with respect to a substantially stationary saw, a great many advantages are obtained such as, for example, greater accuracy and speed of operation. As a matter of fact, with the automatic control described hereinabove, a single operator may operate several machines instead of one, thereby increasing the production very considerably.

It is to be understood that although certain specific forms of apparatus have been described in detail, the invention is not limited to an apparatus embodying the particular constructions shown, the constructions shown here being merely illustrative of one form that the apparatus may assume.

All such changes and modifications as come within the scope of the appended claims are embraced thereby.

I claim:

1. In a machine for cutting materials, the combination of a work table, a cutting means mounted for movement relative to said table, a movable means for indicating the path of the cutting means on material on said work table, manually controlled means for moving said indicating means, and motor driven means for automatically moving said cutting means into position to follow the path indicated by said indicating means.

2. In a machine for cutting materials, the combination of a work table, a cutting means mounted for movement relative to said table, a movable projector for projecting a line indicating the path of the cutting means on material on said work table, manually controlled means for moving said projector, and motor driven means for automatically moving said cutting means into position indicated by said projector.

3. In a machine for cutting materials, the combination of a work table, a cutting means mounted for movement relative to said table, a movable projector for projecting a line indicating the path of the cutting means on material on said work table, manually controlled means for moving said projector, motor driven means for automatically moving said cutting means into position indicated by said projector, and means operably responsive to the movement of material to a position to contact said cutting means for rendering said motor driven means inoperative.

4. In a machine for cutting materials, the combination of a work table, a cutting means mounted for movement relative to said table, a movable projector for projecting a line indicating the path of the cutting means on material on said work table, manually controlled means for moving said projector, motor driven means for automatically moving said cutting means into position indicated by said projector, said motor driven means including a switch comprising a pair of spaced contact bars carried by the projector, and a contact point in operable sliding relation to said bars, said contact point being movable by said motor driven means.

5. In a machine for cutting materials, the combination of a work table, a cutting means mounted for movement relative to said table, a movable means for indicating the path of the cutting means on material on said work table, manually controlled means for moving said indicating means, motor driven means for automatically moving said cutting means into the path indicated by said indicating means, and means operably responsive to the movement of material to a position to contact said cutting means for rendering said motor driven means inoperative.

6. In a machine for cutting materials, the combination of a work table, a cutting means mounted for movement relative to said table, a movable means for indicating the path of the cutting means on material on said work table, manually controlled means for moving said indicating means, motor driven means for automatically moving said cutting means into the path indicated by said indicating means, said motor driven means including a switch comprising a pair of spaced contact bars carried by the indicating means, and a contact point in operable sliding relation to said bars, said contact point being movable by said motor driven means, and means operably responsive to the movement of material to a position to contact said cutting means for rendering said motor driven means inoperative.

EDWIN J. GRANT.